H. S. BULLER.
PLATE HOLDING ATTACHMENT FOR FILM CAMERAS.
APPLICATION FILED AUG. 26, 1912.
1,067,971.
Patented July 22, 1913.
2 SHEETS—SHEET 1.
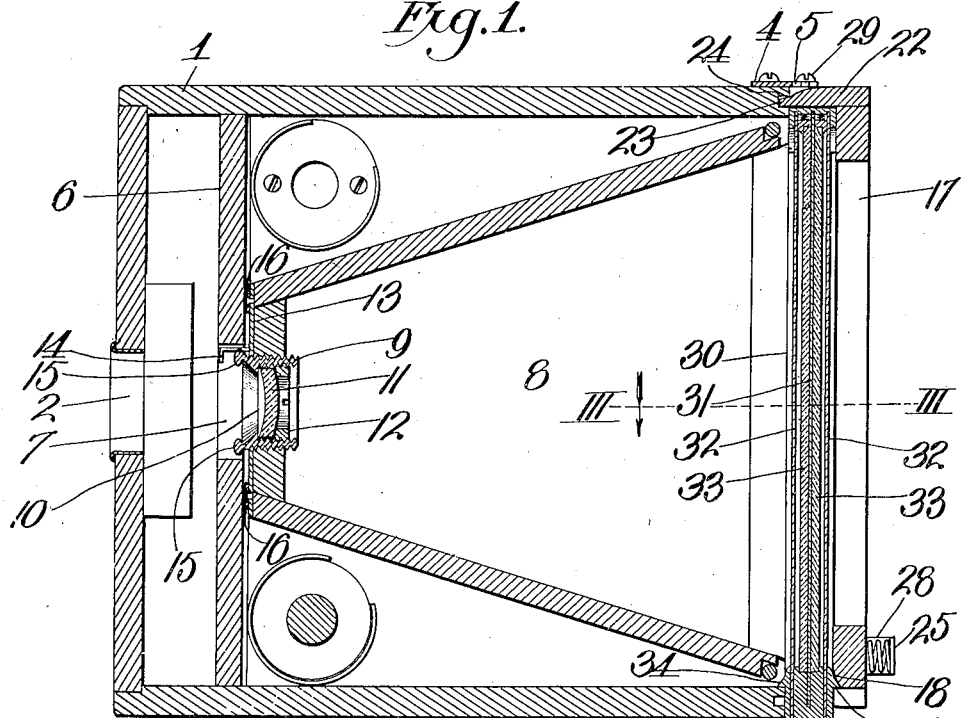
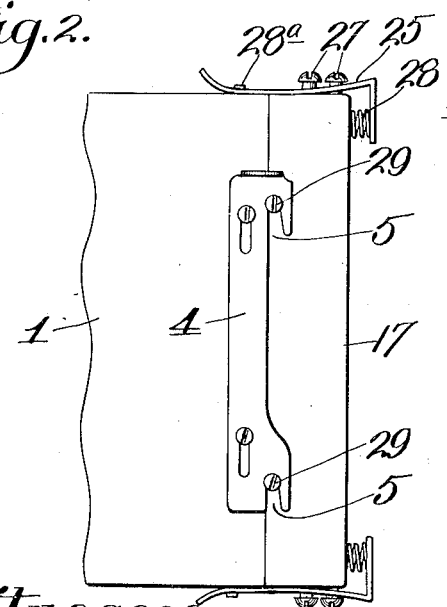
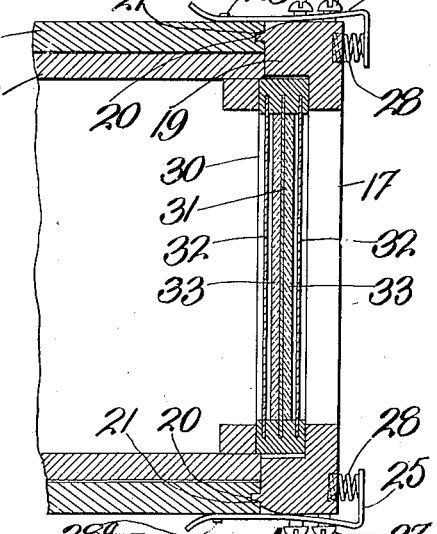
Witnesses
Frank R Glow
M. K. Preston
Inventor
H. S. Buller
By George Y. Thorpe Atty.

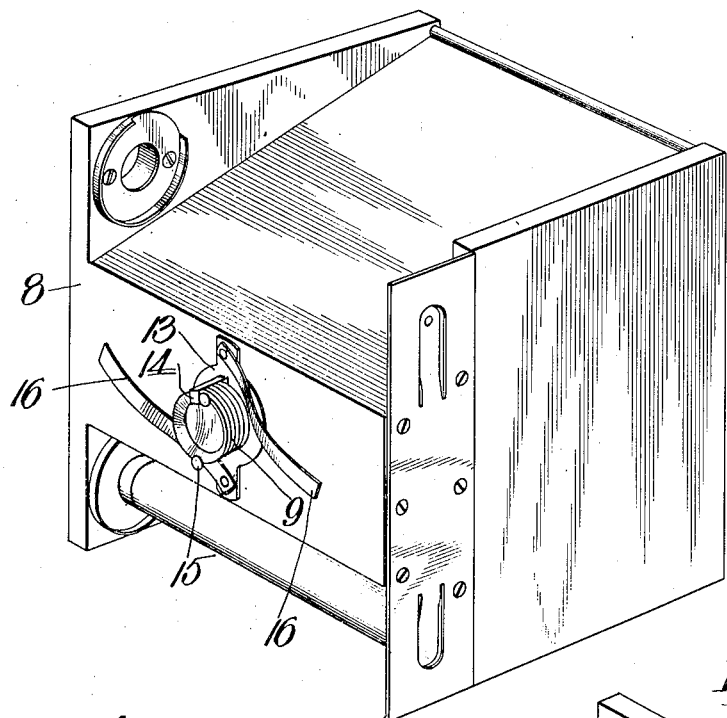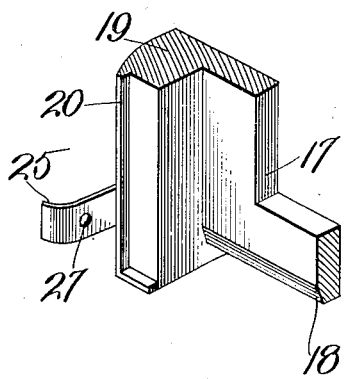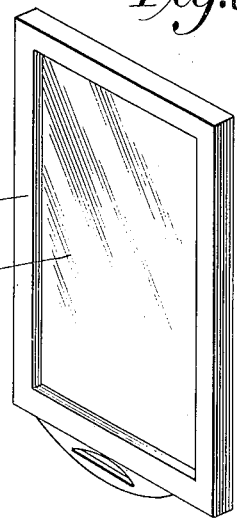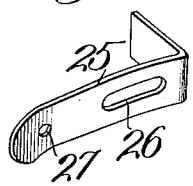

UNITED STATES PATENT OFFICE.

HENRY S. BULLER, OF SPRING VALLEY TOWNSHIP, McPHERSON COUNTY, KANSAS.

PLATE-HOLDING ATTACHMENT FOR FILM-CAMERAS.

1,067,971.  Specification of Letters Patent.  Patented July 22, 1913.

Application filed August 26, 1912. Serial No. 716,986.

*To all whom it may concern:*

Be it known that I, HENRY S. BULLER, a citizen of the United States, residing in Spring Valley township, in the county of McPherson and State of Kansas, have invented certain new and useful Improvements in Plate-Holding Attachments for Film-Cameras, of which the following is a specification.

This invention relates to cameras and more especially to film cameras of that type in which all of the sides of the box or casing of the camera, except the back, are in rigid or fixed relation and the back is in the form of a hinged door, and the object of the invention is to produce attachments whereby photographic plates can be used when desired, in lieu of the customary film roll.

With this general object in view, the invention consists in certain novel and peculiar features of construction and organization as hereinafter described and claimed; and in order that it may be fully understood reference is to be had to the accompanying drawings, in which:—

Figure 1, is a central, vertical, longitudinal section of a film camera equipped with attachments embodying my invention. Fig. 2, is a plan view of a part of a camera with one of my attachments in place. Fig. 3, is a horizontal section on the line III—III of Fig. 1. Fig. 4, is a perspective view of the lens and film holding frame of the camera, equipped with attachments embodying my invention. Fig. 5, is a sectional perspective view of a plate-holder holding frame, embodying my invention. Fig. 6, is a perspective view of a frame equipped with a ground glass for focusing purposes. Fig. 7, is a perspective view of one of a pair of angle plates forming a part of the attachment.

In the said drawings, where like reference characters identify corresponding parts in all the figures, 1 is a box or casing, provided in its front end with a shutter-opening 2 (the shutter mechanism being omitted as forming no part of the invention), and a hinged door 3 for closing the rear end of the casing when a film is used in a camera, the said door being swung downward to open position as shown in Fig. 1, when photographic plates are to be used in the camera.

4 is a slide for holding the door closed and for assisting in securing in position the plate-holder holding frame, as hereinafter more particularly referred to, said slide being provided with bifurcations 5 to receive headed pins, (not shown), projecting from the upper edge of the door 3, and headed pins projecting from the upper edge of the said holding frame, as hereinafter explained.

6 is a partition in the casing, provided with a lens-opening 7, and removably arranged within the casing back of the partition 6, is a frame 8, for holding the lens and reel.

9 is a threaded tube mounted in the front end of the frame 8, in line with openings 7 and 2, and provided internally with a rearwardly-disposed shoulder 10 against which the lens 11, is clamped by threaded ring 12 screwed into tube 9.

The frame 8, is of common and well known construction, but in order that it may be used in connection with photographic plates as well as with a photographic film, the lens must be adjustable longitudinally of the casing, and as frequent adjustment of the tube in the holder, which is made of wood, would soon unduly enlarge the opening in the latter, I secure to the front side of the frame, a thin plate 13 to take into the threaded tube. Projecting forwardly from said plate is a right-angle shaped arm 14 which limits the forward adjustment of the tube, the latter occupying such position when the camera is used for photographing with a film, and soldered or otherwise suitably secured to the front extremity of the tube 9, are finger pieces 15 whereby the tube can be easily turned to advance or retract the lens, the latter being shown retracted in Fig. 1, in which position, it is adapted for use in connection with a photographic plate.

As it is desirable that the lens shall not have play or vibratory motion in the casing when photographing with plates, I secure to the front end of said frame, a pair of springs 16 adapted to bear against the partition 6, it being obvious that these springs are unobjectionable although not necessary, when photographing with a film.

17 is a holding frame of rectangular form, adapted to be fitted against the rear end of the casing when the camera is to be used to photograph on a plate, and said frame is provided at its lower inner corner with a beveled surface 18. It is also provided at its sides with forwardly-projecting flanges 19, to bear against the rear ends of the sides of the frame 8 and the casing, and said flanges 19 are provided with vertical ribs 20 to enter the vertical grooves 21 found in the sides of boxes or casings of the type under consideration, these ribs and grooves serving to guard against lateral movement of the frame 17, and to exclude light from the casing. Frame 17 is also provided with a top flange 22, projecting forwardly and terminating at its front edge in a rib 23, engaging the groove 24 in the rear edge of the top of the box or casing, this groove and a similar unnumbered groove in the rear edge of the bottom of the casing being also common in cameras of the type under consideration. To secure this holding frame in position and yet allow it to have a slight retracting movement, it is provided at each side with an angle plate 25, provided with a longitudinal slot 26, slidably engaging a guide shown as composed of a pair of headed screws 27, projecting from the sides of the holding frame. The slotted arms of the plates extend longitudinally and their other arms project inwardly back of frame 17, and coiled springs 28 are interposed between said frame and the last-named arms for the purpose of exerting forward yielding pressure against the frame.

The slotted arms are flared outwardly at their front ends for convenience in slipping the frame in position, and near such ends are provided with holes 27 adapted to engage pins 28ª projecting outward from the sides of the casing, and applied thereto for use only when printing plates are to be employed, and the plates 25 have slight pivotal or springing movement, to facilitate the engagement of the pins with said openings 27, the flared ends of the plates being also convenient as finger holds when it is desired to disengage the plates from said pins 28ª.

As an additional means for securing the holding frame to the casing without interfering with a slight rearward movement of the lower end of said frame, the flange 22 of the latter is equipped with a pair of headed pins 29, for engagement by the bifurcations 5 of the slide 4, as shown in Fig. 2.

An ordinary plate holder, of a common and well known type, adapted to be interposed between the holding frame 17 and the rear end of the casing, consists of a frame 30 containing a central opaque partition 31, and a pair of opaque slides 32 disposed at opposite sides of and spaced from the partition to provide chambers for the reception of the plates 33, the holder also having the customary beveled ribs 34, near its lower end.

To secure the plate holder in position, its upper end is fitted between the bottom of the casing and frame 17, and slid upward until its foremost rib 34 encounters the rear edge of the bottom, and in passing this obstruction, it is caused to swing rearward slightly at the bottom, and as a result represses the lower part of the frame 17 against the resistance of springs 28. As said foremost rib 34 clears the upper side of the bottom and the other rib 34 engages the beveled surface 18 of the bottom of the frame 17, the springs 28 are free to press the said frame and plate holder forward until the first-named rib overlies the bottom of the casing and the lower part of the plate holder bears firmly against the rear edge of the bottom, as shown clearly in Fig. 1, the plate holder at the same time pressing the frame 8 forward so that it shall be held firmly against the partition 6. When thus arranged, it will be noticed that the foremost plate 33 upon which the exposure is to be made stands back of the rear end of the lens holding frame 8, and for this reason it is necessary to adjust the lens rearwardly, as shown in Fig. 1.

With the parts thus arranged, the shutter can be opened through the usual or any preferred instrumentalities, (not shown), of the camera, the foremost slide 30 being, of course, first withdrawn from in front of the said plate. The said slide being then restored to its original position, the plate holder can be removed, reversed and replaced preliminary to the exposure of the other plate, it being understood that to remove the plate holder it is first pulled rearward slightly to swing the holding frame 17, back sufficiently to permit the foremost rib 34, of the plate holder, to clear the rear edge of the bottom of the casing, so that the plate holder can be withdrawn or slid from position.

As a convenient means of getting the desired focus preliminary to printing on a plate, I provide a slide frame 35, equipped with a ground glass plate 36, which frame can be slipped into the holding frame 17 in the place occupied by the plate holder in Fig. 1, and then withdrawn as the focus is determined upon, and replaced by the plate holder.

From the above description, it will be apparent that I have produced attachments which can be easily and cheaply applied to a film camera of the type described, and while I have illustrated and described the preferred embodiment of the invention, I wish it to be understood that I reserve the right to make all changes of form, detail construction and organization properly falling within the spirit and scope of the invention as defined in the appended claims.

I claim:

1. In a camera, a casing having a shutter opening, a partition therein, having a lens opening, a frame within the casing back of the partition, a lens carried thereby, a holding frame, detachably secured to the rear end of the casing, and a plate holder removably held between the rear end of the casing and said holding frame.

2. In a camera, a casing having a shutter opening, a partition therein, having a lens opening, a frame within the casing back of the partition, a lens carried thereby, a holding frame pressed yieldingly against the rear end of the casing, and a plate holder removably clamped between the rear end of the casing and said holding frame.

3. In a camera, a casing having a shutter opening, a partition therein, having a lens opening, a frame within the casing back of the partition, a lens carried thereby, a holding frame at the rear end of the casing and engaging the sides and top thereof so as to exclude light from the casing at such points of engagement and spaced at its bottom from the bottom of the casing and provided with a beveled surface at its inner lower edge, means for holding the holding frame yieldingly against the casing, and a plate holder introduced between the casing and said holding frame through the space between the lower ends of said elements and held pressed yieldingly against the frame within the casing by said holding frame, and provided with a rib fitting in the casing and resting on the bottom thereof and a similar rib engaged by the beveled surface of said holding frame.

4. In a camera, a casing having a shutter opening, a partition therein, having a lens opening, a frame within the casing back of the partition, one or more springs interposed between the partition and said frame, a lens carried by said frame in line with the lens opening and shutter opening, a holding frame detachably secured to the rear end of the casing, a plate holder removably held between said holding frame and the rear ends of the casing and the frame therein, and means for yieldingly pressing the holding frame toward the casing and plate holder to cause the latter to press the frame within the casing forwardly to compress the said spring or springs.

5. In a camera, a casing having a shutter opening, a partition therein, having a lens opening, a frame within the casing back of the partition, a lens carried thereby in line with the lens and shutter openings, a holding frame at the rear end of the casing and provided at its lower inner edge with a beveled surface, side flanges projecting forward from the holding frame and engaging the sides of the casing, a top flange projecting forward from the holding frame and engaging the top of the casing, means for securing the casing and holding frame together at the top, side plates slidably carried by the holding frame and detachably interlocked with the sides of the casing, and springs for holding the holding frame pressed forwardly against the casing.

6. In a camera, a casing having a shutter opening, a partition therein, having a lens opening, a frame within the casing back of the partition, a lens carried thereby in line with the lens and shutter openings, a holding frame at the rear end of the casing and provided at its lower inner edge with a beveled surface, side flanges projecting forward from the holding frame and engaging the sides of the casing, a top flange projecting forward from the holding frame and engaging the top of the casing, means for securing the casing and holding frame together at the top, side plates slidably carried by the holding frame and detachably interlocked with the sides of the casing, and springs interposed between the rear ends of said plates and the rear side of the holding frame to hold the latter yieldingly against the casing.

7. A holding frame for cameras, comprising a rectangular frame having a beveled surface at its lower inner edge, and provided at its sides with forwardly projecting flanges and vertical ribs at the front edges of said flanges, and also provided at its top with a forwardly projecting flange terminating in a horizontal rib.

In testimony whereof I affix my signature, in the presence of two witnesses.

HENRY S. BULLER.

Witnesses:
  K. M. THORPE,
  G. Y. THORPE.